US012253671B2

(12) United States Patent
Chenderovitch

(10) Patent No.: US 12,253,671 B2
(45) Date of Patent: Mar. 18, 2025

(54) MULTI-TASK AUGMENTED REALITY HEADS UP DISPLAY

(71) Applicant: GENERAL STARLIGHT CO. INC., Woodbridge (CA)

(72) Inventor: Simon Chenderovitch, Woodbridge (CA)

(73) Assignee: GENERAL STARLIGHT CO. INC., Woodbridge (CA)

( * ) Notice: Subject to any disclaimer, the term of this patent is extended or adjusted under 35 U.S.C. 154(b) by 0 days.

(21) Appl. No.: 18/224,342

(22) Filed: Jul. 20, 2023

(65) Prior Publication Data

US 2024/0027758 A1  Jan. 25, 2024

Related U.S. Application Data

(60) Provisional application No. 63/391,583, filed on Jul. 22, 2022.

(51) Int. Cl.
*G02B 27/01* (2006.01)

(52) U.S. Cl.
CPC ....... *G02B 27/0101* (2013.01); *G02B 27/017* (2013.01); *G02B 2027/0138* (2013.01); *G02B 2027/014* (2013.01)

(58) Field of Classification Search
CPC ...... G02B 27/017; G02B 23/12; G02B 23/16; G02B 27/0101; G02B 2027/0138; G02B 2027/014
See application file for complete search history.

(56) References Cited

U.S. PATENT DOCUMENTS

2012/0075168 A1\* 3/2012 Osterhout ............... G06F 3/017
345/8

\* cited by examiner

*Primary Examiner* — Yaron Cohen
(74) *Attorney, Agent, or Firm* — Global IP Counselors, LLP

(57) ABSTRACT

A display device includes a housing having a first end capable of connecting to a night vision device and a second end capable of connecting to an eyepiece, a camera configured to receive an image from the night vision device, a decoder configured to convert the image from the night vision device from an analogue signal into digital signal, and a display to display the converted image, so that the converted image can be viewed though the eyepiece.

20 Claims, 12 Drawing Sheets

MULTI-TASK AUGMENTED REALITY HEADS UP DISPLAY

CROSS-REFERENCE TO RELATED APPLICATION

This application claims priority to U.S. Provisional Patent Application No. 63/391,583, filed Jul. 22, 2023. The entire disclosure of U.S. Provisional Patent Application No. 63/391,583 is incorporated herein by reference.

BACKGROUND

Field of the Invention

The present disclosure generally relates to a multi-task augmented reality heads up display.

Background Information

Conventional night visions devices allow images to be produced in levels of light approaching total darkness. Most conventional night vision devices use intensifier tubes to provide optoelectronic image enhancement. These types of intensifier tubes work by sensing small amount of light that is reflected off objects and then electrically amplifying that light into a characteristic glowing image.

SUMMARY

It has been determined that conventional night vision devices are unable to record images and/or overlay data that can be helpful to the user. In view of the state of the known technology, one aspect of the present disclosure includes a device that is capable of recording images and providing situational data that is overlaid on the image. This device can provide increased situational awareness, comprised of optical, electronic, and mechanical components—i.e., a multi-task augmented reality heads up display (MTAR-HUD). The device is capable of recording data and overlaying information by transforming analog images from a conventional night vision monocular into digital information.

This aspect of the present disclosure is a display device that includes a housing having a first end capable of connecting to a night vision device and a second end capable of connecting to an eyepiece, a camera configured to receive an image from the night vision device, a decoder configured to convert the image from the camera from an analogue signal into digital signal, and a display to display the converted image, so that the converted image can be viewed though the eyepiece.

Another aspect of the present disclosure provides a device comprising a housing having a first end capable of connecting to a night vision device and a second end capable of connecting to an eyepiece, a camera disposed within the housing and configured to receive an image, at least one sensor to determine a parameter related to the orientation or location of the device, an electronic controller configured to overlay the parameters on the converted image when the converted image is viewed, and a display to display the converted image with the parameter overlaid on the image, so that the converted image is capable of being viewed with the parameter.

Another aspect of the present disclosure provides a method for displaying an image, comprising connecting a first end of a housing of a display device to a night vision device, connecting a second end of the housing to an eyepiece, receiving an image from the night vision device, via a camera disposed within the housing, converting the image from the night vision device, via a decoder, from an analogue signal into a digital signal, and displaying the converted image on a display, so that the converted image can be viewed though the eyepiece.

Embodiments of the display device result in an enhanced device capable of coupling to a night vision device and which can provide recording capabilities and overlay crucial information that could be vital to an objective.

DETAILED DESCRIPTION

FIGS. 1-7 illustrate a device for a multi-task augmented reality heads up display 18 (MTAR-HUD) 10 according to an embodiment of the invention. It will be apparent to those skilled in the art from this disclosure that the following descriptions of the embodiments are provided for illustration only and not for the purpose of limiting the invention as defined by the appended claims and their equivalents.

Figure 1:
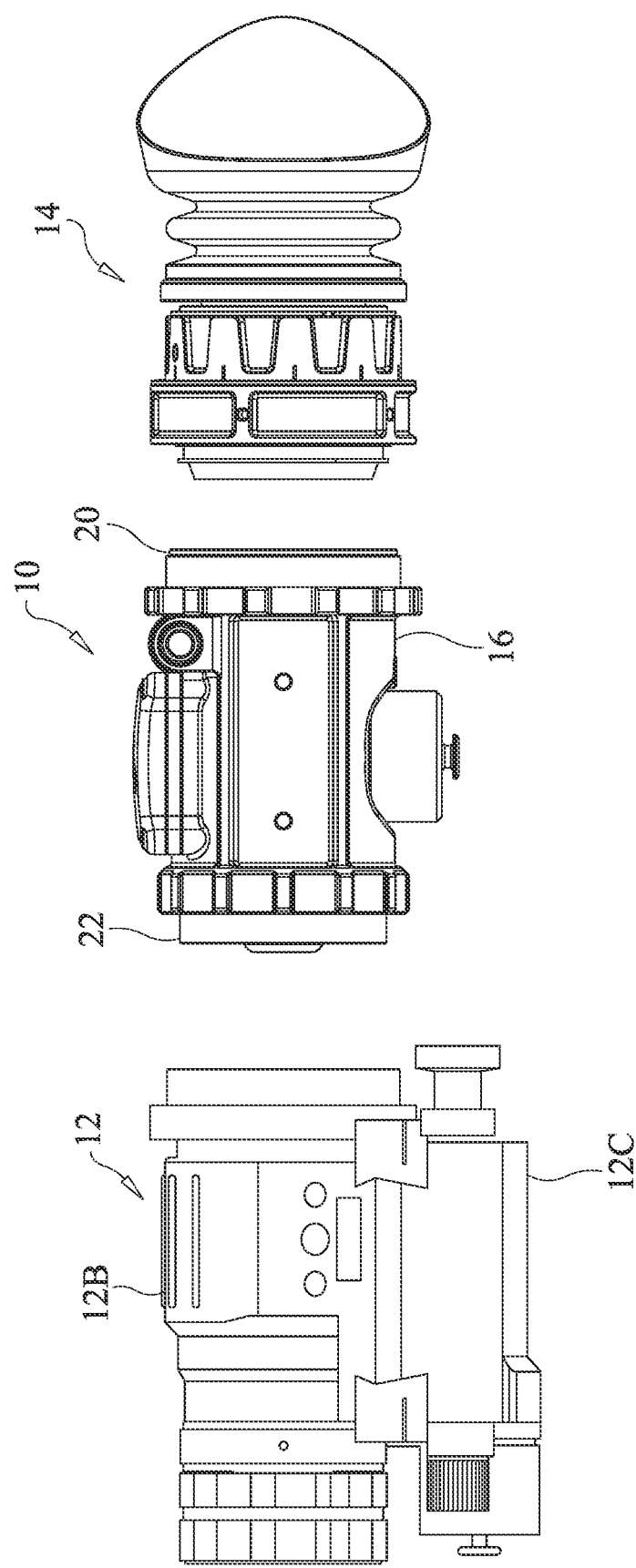
FIG. 1 illustrates a side view of a device for a multi-task augmented reality heads up display according to an embodiment of the invention disposed between a night vision monocular and an eye piece.

As illustrated in FIG. 1, the MTAR-HUD 10 can be inserted to or coupled between a conventional night vision device 12 and a conventional eyepiece 14. Thus, as one of ordinary skill would understand, the MTAR-HUD 10 can enhance and improve a conventional night vision device 12 by coupling to the night vision device 12 using the existing coupling mechanisms. As illustrated in this embodiment, the MTAR-HUD 10 can be threaded to the night vision device 12 and the eyepiece 14. It is noted that such a coupling is merely one embodiment and the MTAR-HUD 10 can couple to a night vision device 12 in any manner desired or be integrated into a night vision device 12.

Moreover, as can be understood, the MTAR-HUD 10 can be used without connection to a night vision device 12. That is, the MTAR-HUD 10 can be operated as a standalone device capable of viewing an image and recording the image, while providing a heads up display 18 of information, as discussed herein.

As can be understood, when attached to a night vision device 12, the MTAR-HUD 10 improves the basic operation of the night vision device 12 by providing a heads up display 18 and providing recording capabilities. In one embodiment, the night vision device 12 can be night vision googles (optoelectronic devices) that enable visualization of images in low levels of light, improving night vision. These devices can enhance ambient visible light and convert near-infrared light into visible light which can be seen by the user; this is known as image intensification. By comparison, viewing of infrared thermal radiation is referred to as thermal imaging and operates in a different section of the infrared spectrum.

Generally, a night vision device 12 includes an image intensifier tube 12A, a protective housing 12B, an eyepiece 14 and can have some type of mounting system 12C. The image produced by a night vision device 12 is typically monochrome green, as green is considered to be the easiest color to view for prolonged periods in the dark. Night vision devices can be passive, relying solely on ambient light, or may be active, using an IR (infrared) illuminator to better visualize the environment.

Night vision devices can be handheld but many are head-mounted and attach to helmets or other head-mountable gear. When used with firearms, an IR laser sight is often mounted to the user's weapon. The laser sight produces an infrared beam that is only visible through a night vision device 12 and aids with aiming. Some night vision device 12s are specially made to be mounted to firearms. These can used in conjunction with weapon sights like rifle scopes or can be used as standalone sights; some thermal weapon sights have been designed to provide similar capabilities.

The device herein can be used in conjunction with desirable night vision device and is not limited to the specific embodiments set forth herein. It is also noted that, as discussed herein, the MTAR-HUD 10 can be used by itself to view images, record images and data, and provide desired overlay data on an image, among other things.

As illustrated in FIGS. 2-8, in one embodiment, the MTAR-HUD 10 can be encased in a cylindrical rugged housing 16. This housing 16 can be similarly sized to a night vision device 12 and/or an eyepiece 14, such that the night vision device 12 does not become overly bulky and/or maintains the aesthetics or operability of the corresponding night vision device 12 and/or eyepiece 14. The housing 16 protects the internal components to ensure that the MTAR-HUD 10 is useful in extreme situations. For example, the housing 16 can be waterproof and/or resistant to impact that would otherwise damage or destroy the internal components of the device. It is noted that the MTAR-HUD 10 can be any size or shape desired and be formed of any material.

The housing 16 can have a display 18 at a first end 20, a lens for a camera 24 at a second or opposite end, and can also have an input (video in) connection 26 and output (video out) connection 28 to enable uploading or downloading data or information to the device. Although it is noted that data can be uploaded or downloaded in any desired wired or wireless manner. For example, the data can be uploaded or downloaded via BLUETOOTH, or a cellular or satellite network or in any wireless manner, as discussed in more detail below. The housing 16 is sized and configured to enable the MTAR-HUD 10 to house components therein to covert images captured by the camera 24 to be displayed in the display 18.

Figure 8:
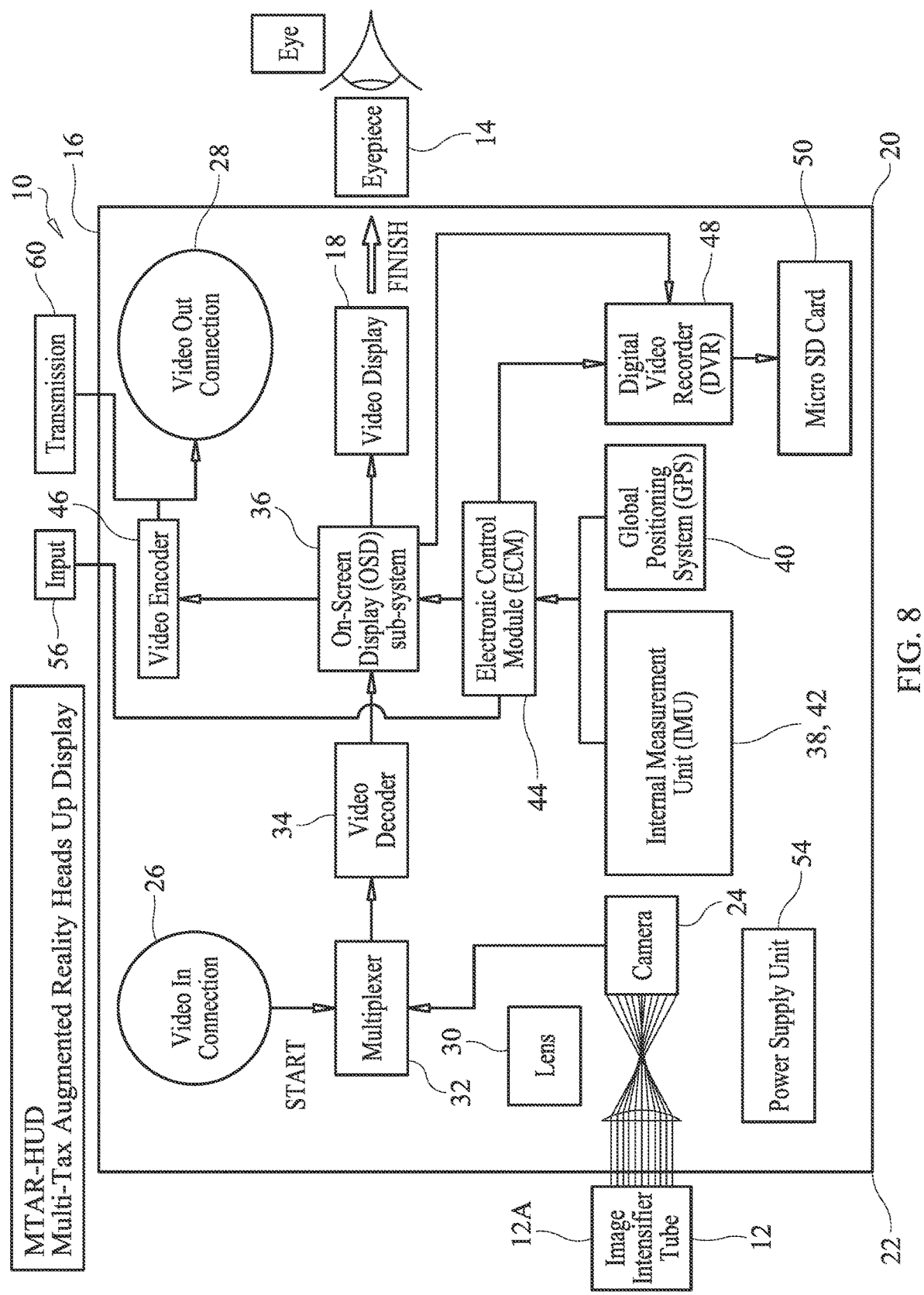
FIG. 8 illustrates a schematic of the device for a multi-task augmented reality heads up display of FIG. 1.

FIG. 8 illustrates the components of the MTAR-HUD 10 disposed within the housing 16. As noted, images pass from the image intensifier tube 12A of the night vision device 12 (or from the surrounding area if used without a night vision device 12) and into the MTAR-HUD 10. In particular, the enhanced image from the night vision device 12 passes through a lens 30 in the MTAR-HUD 10 and into a camera 24. The lens 30 can be any suitable lens, such as a convex lens that enables the image to be focused onto the camera 24. The camera 24 captures the image and transmits the image to a multiplexer 32. As can be understood, the multiplexer 32 is a device that enables one or more analog or digital input signals to travel together over the same communications transmission link. Here, any suitable multiplexer can be used. The multiplexer 32 can also be in communication with the video in connection 26, so that video from another device can communicate images into the MTAR-HUD 10. In other words, the multiplexer 32 can receive images or image information from the camera 24 and the video in connection 26. The video in connection 26 can be any suitable connection that enables an external electrical component to be connected thereto.

The multiplexer 32 can transmit the information from the camera 24 and/or the video in connection 26 to a video decoder 34. The video decoder 34 is an electronic circuit, and can be a single integrated circuit chip, that converts base-band analog video signals to digital video. In some embodiments, the video decoder 34 can enable programmable control over video characteristics such as hue, contrast, and saturation. The video decoder 34 then sends the information to a On screen Display subsystem (OSD) 36.

The OSD 36 is a sub system that generally combines the image information with sensor data information or overlay information. The subsystem can include an electronic controller that contains the software that processes information. Thus, as can be understood, the OSD 36 can include a microcomputer with a control program that controls the MTAR-HUD 10. The OSD 36 can also include other conventional components such as an input interface circuit, an output interface circuit, and storage devices such as a ROM (Read Only Memory) device and a RAM (Random Access Memory) device. The memory circuit stores processing results and control programs such as ones for operation that are run by a processor circuit. The OSD 36 is operatively coupled to the elements in the device in a conventional manner. The internal RAM of the OSD 36 stores statuses of operational flags and various control data. The OSD 36 can be capable of selectively controlling any of the components of the device in accordance with a control program. It will be apparent to those skilled in the art from this disclosure that the precise structure and algorithms for the OSD 36 can be any combination of hardware and software that will carry out the functions of the embodiments of the present invention.

The MTAR-HUD 10 includes sensors 38 and/or location determination devices 40 or any other positioning devices or sensors 38. The MTAR-HUD 10 can include an inclinometer, an accelerometer, a stadiametric rangefinder, a compass, as well as a real time clock. Many of these devices can be part of an internal measurement unit (IMU) 42. The IMU 42 can include pitch, roll, yaw and stadiametric rangefinder sensors 38, or any other device that enables internal measurement of the MTAR-HUD 10. Thus, the MTAR-HUD 10 can determine the angles for pitch, roll and yaw and range or distance readings. In one embodiment, the IMU 42 is an inertial measurement unit that measures and reports the specific force, angular rate, and the orientation of the housing 16, using a combination of accelerometers, gyroscopes, and/or magnetometers. In this embodiment, the IMU 42 can detect linear acceleration using one or more accelerometers and rotational rate using one or more gyroscopes. In one embodiment, the IMU 42 includes an accelerometer, gyro, and magnetometer per axis for each of the three principal axes: pitch, roll and yaw.

The location determination device 40 can be any suitable device, such as the global positioning system (GPS). The location determination device 40 can be any suitable system that enables accurate or desired location to be determined.

The information from the IMU 42 and the location determination device 40 is communicated to an electronic control module (ECM) 44. Similarly to the OSD 36, the ECM 44 can include a microcomputer with a control program that controls the IMU 42 and the location determination system and any other sensors 38 or devices that provide information to be overlayed on the image from the camera 24. The ECM 44 can also include other conventional components such as an input interface circuit, an output interface circuit, and storage devices such as a ROM (Read Only Memory) device and a RAM (Random Access Memory) device. The memory circuit stores processing results and control programs such as ones for operation that are run by a processor circuit. The ECM 44 is operatively coupled to the elements in the device in a conventional manner. The internal RAM of the ECM 44 stores statuses of operational flags and various control data. The ECM 44 can be capable of selectively controlling the components of the IMU 42 and the location determination device 40 and any other sensors 38 or devices that provide information to be overlayed on the image from the camera 24 in accordance with a control program. It will be apparent to those skilled in the art from this disclosure that the precise structure and algorithms for the ECM 44 can be any combination of hardware and software that will carry out the functions of the embodiments of the present invention.

The ECM 44 can control the information from the IMU 42 and the IMU 42 and the location determination device 40 and any other sensors 38 or devices that provide information to be overlayed on the image from the camera 24. In other words, the ECM 44 is configured to control the sensor information (data) that is collected using the sensors 38 and/or location determination device 40. This information is communicated to the OSD 36.

The OSD 36 can combine the information into the desired transmission. For example, the OSD 36 can process the data from the video encoder 46 and combine this information with the information from the ECM 44. Thus, the OSD 36 provides a data output that overlies the information from the IMU 42 and the location determination device 40 onto the video. The OSD 36 transmits this combined information through three separate outputs to: 1) the video encoder 46; 2) the video display 18; and 3) a digital video reorder (DVR) 48. While in this embodiment, the OSD 36 transmits this combined information through three separate outputs, it is noted that in other embodiments OSD 36 can transmit the combined information through one, two or more than three separate outputs. For example, in one embodiment, the OSD 36 can transmit the combined information to only the display 18.

Similarly to the video decoder 34, the video encoder 46 is an electronic circuit, and can be contained within a single integrated circuit chip. However, the video encoder 46 converts the digital video to analog video, and sends this analog video to the video out connection 28. The video can then be viewed through a separate viewing device connected to the MTAR-HUD 10 through the video out connection 28. The video out connection 28 can be any suitable connection that enables an external electrical component to be connected thereto.

The OSD 36 can also transmit the combined information to the DVR 48 which can store data on a micro SD card 50 (or any other suitable storage device). Thus all imagery from the image intensifier tube 12A (or external area) and the data from the IMU 42 and the location determination system can be recorded and stored on a micro SD card 50 for viewing at a later time or long term storage.

Additionally, the combined information can be wirelessly transmitted to a remote location. Such transmission can be transmitted via transmitter 60. As can be understood, the combined information can be transmitted through any wireless transmission device or system desired, such as Bluetooth, satellite communication, LTE or another in any other suitable manner. Thus, as can be understood, near field communication can be established, such that users in your vicinity can view the same combined information as the user, and/or the combined information can be viewed in a remote location far from the user (i.e., in any location through satellite communications or LTE or other communication or data transmission systems).

Figure 2:
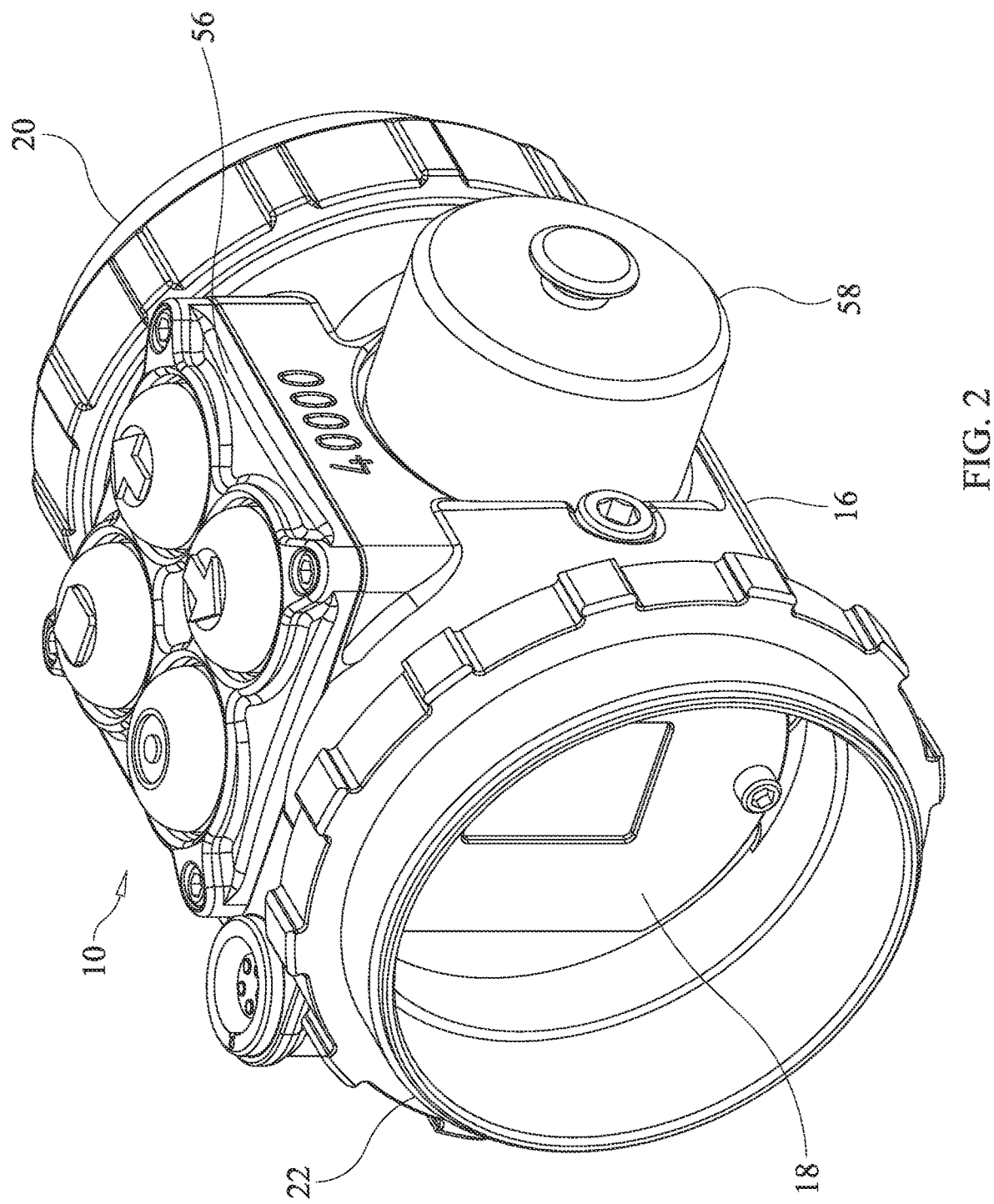
FIG. 2 is a right perspective view of a multi-task augmented reality heads up display according to an embodiment of the invention.
Figure 3:
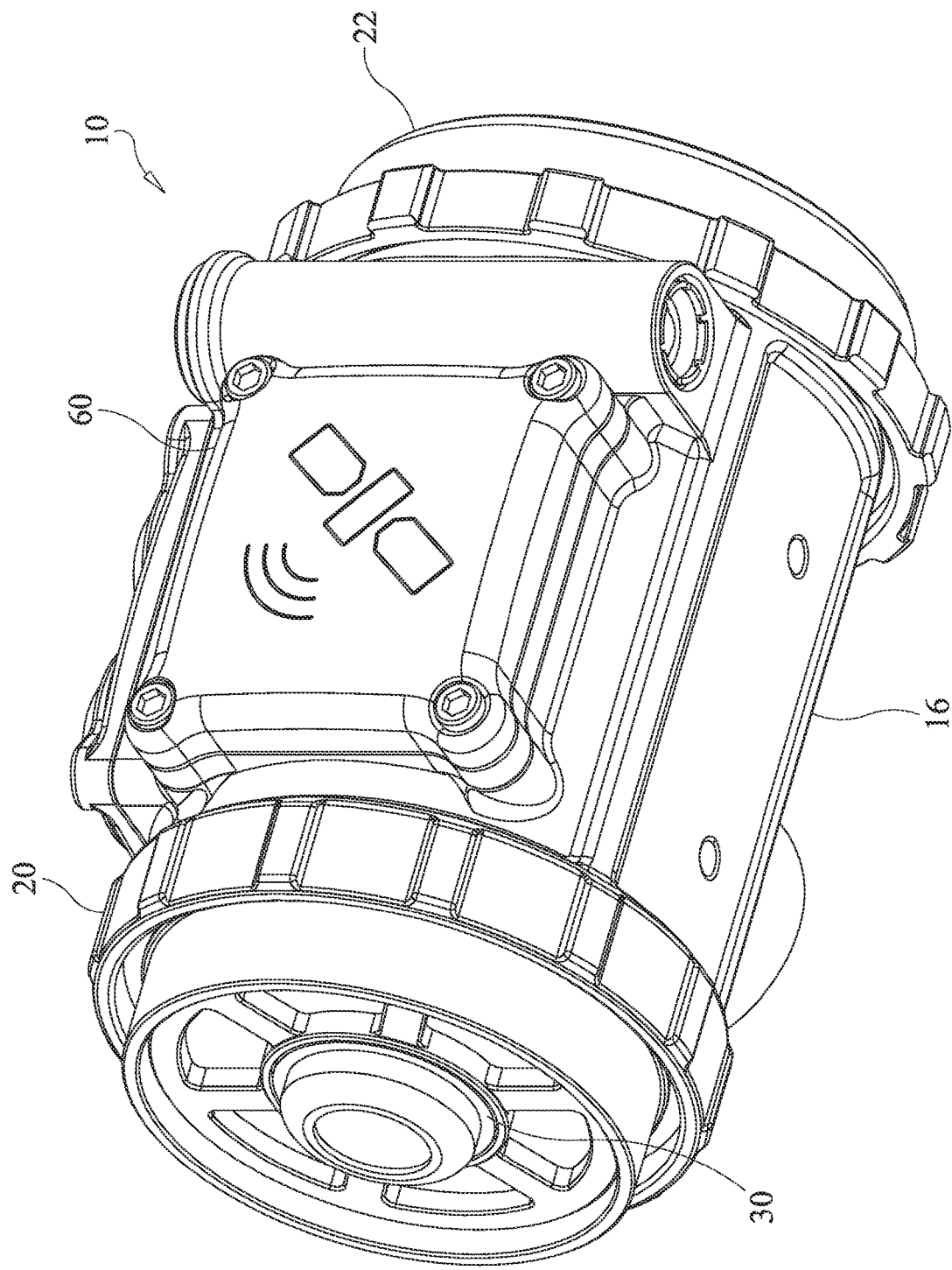
FIG. 3 is a top perspective view of a multi-task augmented reality heads up display according to an embodiment of the invention.
Figure 4:
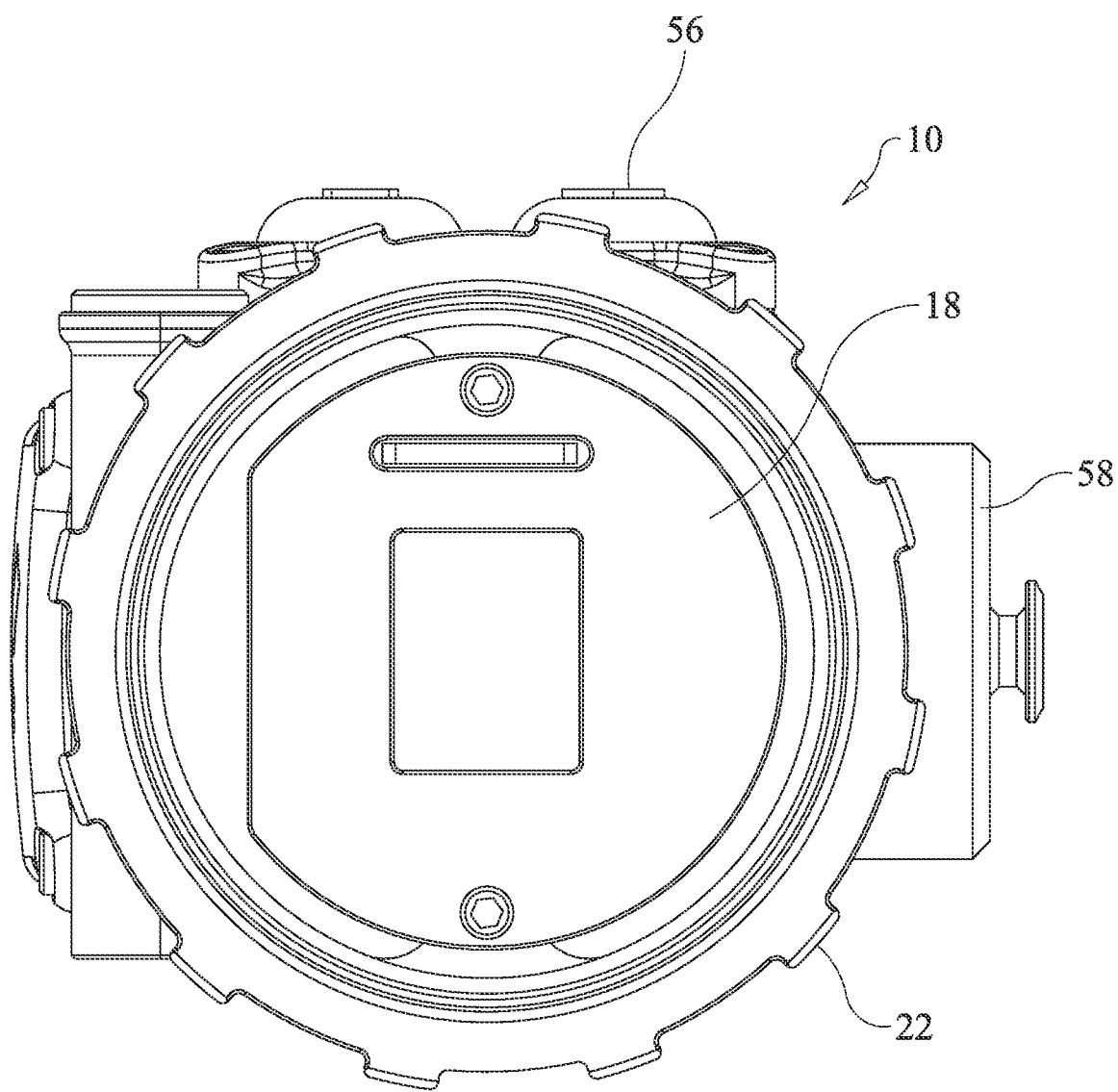
FIG. 4 is a rear view of a multi-task augmented reality heads up display according to an embodiment of the invention.
Figure 5:
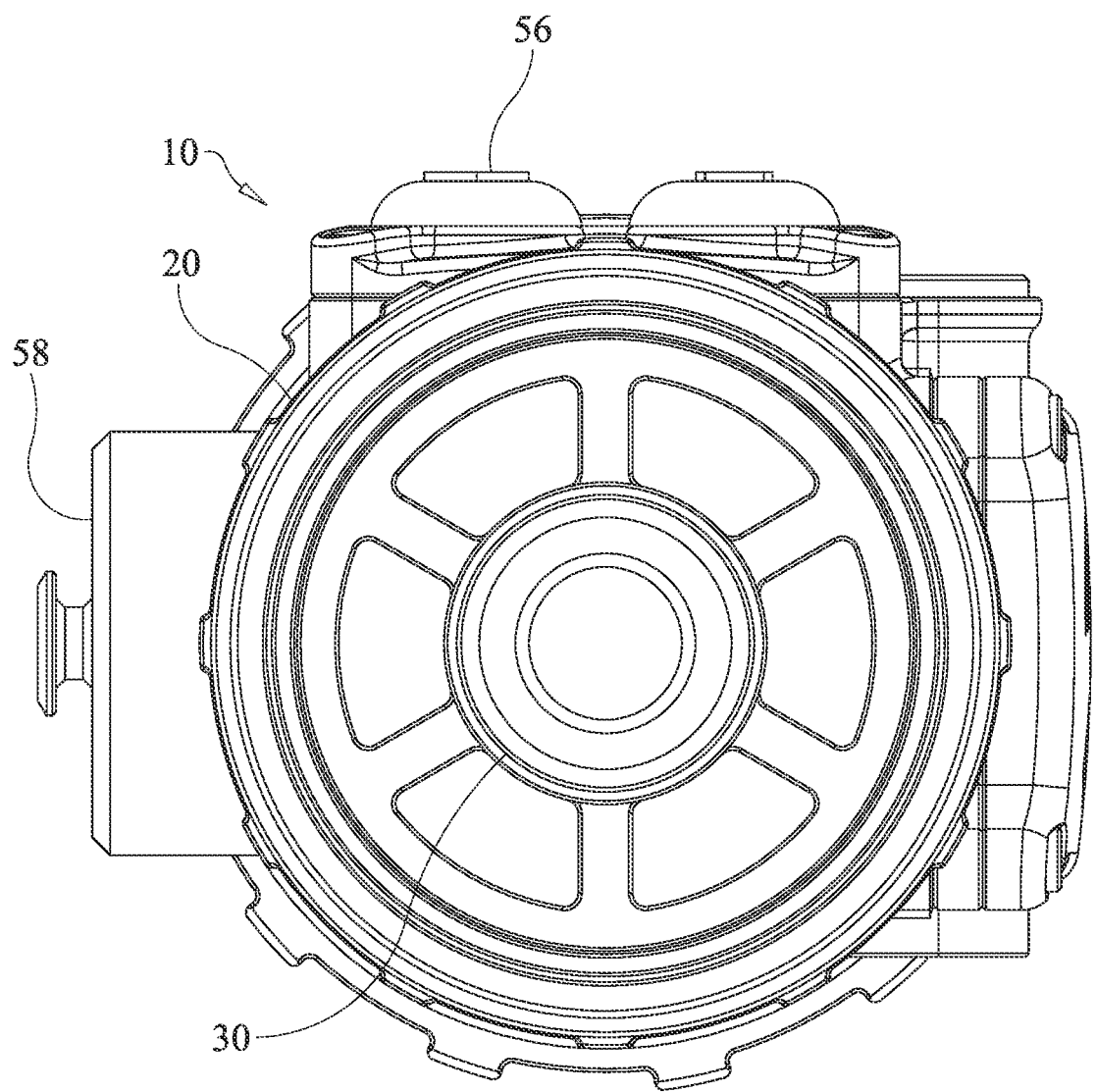
FIG. 5 is a front view of a multi-task augmented reality heads up display according to an embodiment of the invention.

Furthermore, as noted in FIG. 2, the ECM 44 can transmit the data from the sensors 38 and the location determination device 40 to the DVR 48.

The OSD 36 can also transmit the combined information to the video display 18. The video display 18 can thus enable images captured by the camera 24 to be viewed with desired data and/or information overlayed on the images. For example, the display 18 can display range to a target as well as specific positioning location and pitch, roll and/or yaw of the MTAR-HUD 10. It is noted that the data overlay is not limited to the examples herein and the image overlay can be any desired information or combination of information.

In one embodiment the MTAR-HUD 10 includes a mounting bracket or element 58. The mounting element 58 enables the MTAR-HUD 10 to be mounted to a device or wearable article to enable hands free operation by the user. As can be understood, the mounting element 58 can be used when the MTAR-HUD 10 is used as a stand alone device, or in addition to or in replacement of the mounting bracket of the night vision device 12.

Moreover, as can be understood, an operator or user can point the MTAR-HUD 10 by itself in the direction of an object and receive the desired image with data overlay. That is, the MTAR-HUD 10 can be operated by itself to view images with desired data overlayed thereon. Similarly to as described above, the images with the overlay can be stored in a storage device (such as an SD card 50) or it can be viewed or stored by a device connected to the video out connection 28.

In another embodiment, the MTAR-HUD 10 can be connected to the eyepiece 14 that further allows the images with desired data overlayed thereon. In other words, the images with desired data overlayed thereon can be connected to only an eyepiece 14 that increases viewing of the images captured by the camera 24. Similarly to as described above, the images with the overlay can be stored in a storage device (such as an SD card 50) or it can be viewed or stored by a device connected to the video out connection 28.

In a further embodiment, the MTAR-HUD 10 can be coupled to the image intensifier tube 12A and/or the eyepiece 14. In this embodiment, the MTAR-HUD 10 is able to transform a conventional night vision monocular (that cannot record, or stream video—due to only providing an analogue signal, and video recording requiring a digital signal) into a recording unit. As illustrated in FIG. 2, the MTAR-HUD 10 enables communication between the night vision device 12 and the MTAR-HUD 10 encoder 46 that takes the video from analogue signal (from the image intensifier tube 12A) and the decoder 34 that converts the video into digital signal and produces it on screen of the display 18. Additionally, via the established communication of the encoder 46 with the operating system deployment, other information can be produced as an overlay on top of the night vision image on display 18 of the MTAR-HUD 10 unit, that is currently not available to the operator on one device, from GPS, inclinometer, accelerometer, stadiametric rangefinder, compass, as well as a date stamp or real time clock. In other words, data from the GPS unit and/or the internal measurement unit can provide overlay information to the user. See FIG. 10.

The housing 16 of the MTAR-HUD 10 can also include a power supple unit 54 disposed therein. The power supply unit 54 can be any suitable battery (either replaceable and/or rechargeable) or any other desired power supply device that would be suitable.

Figure 6:
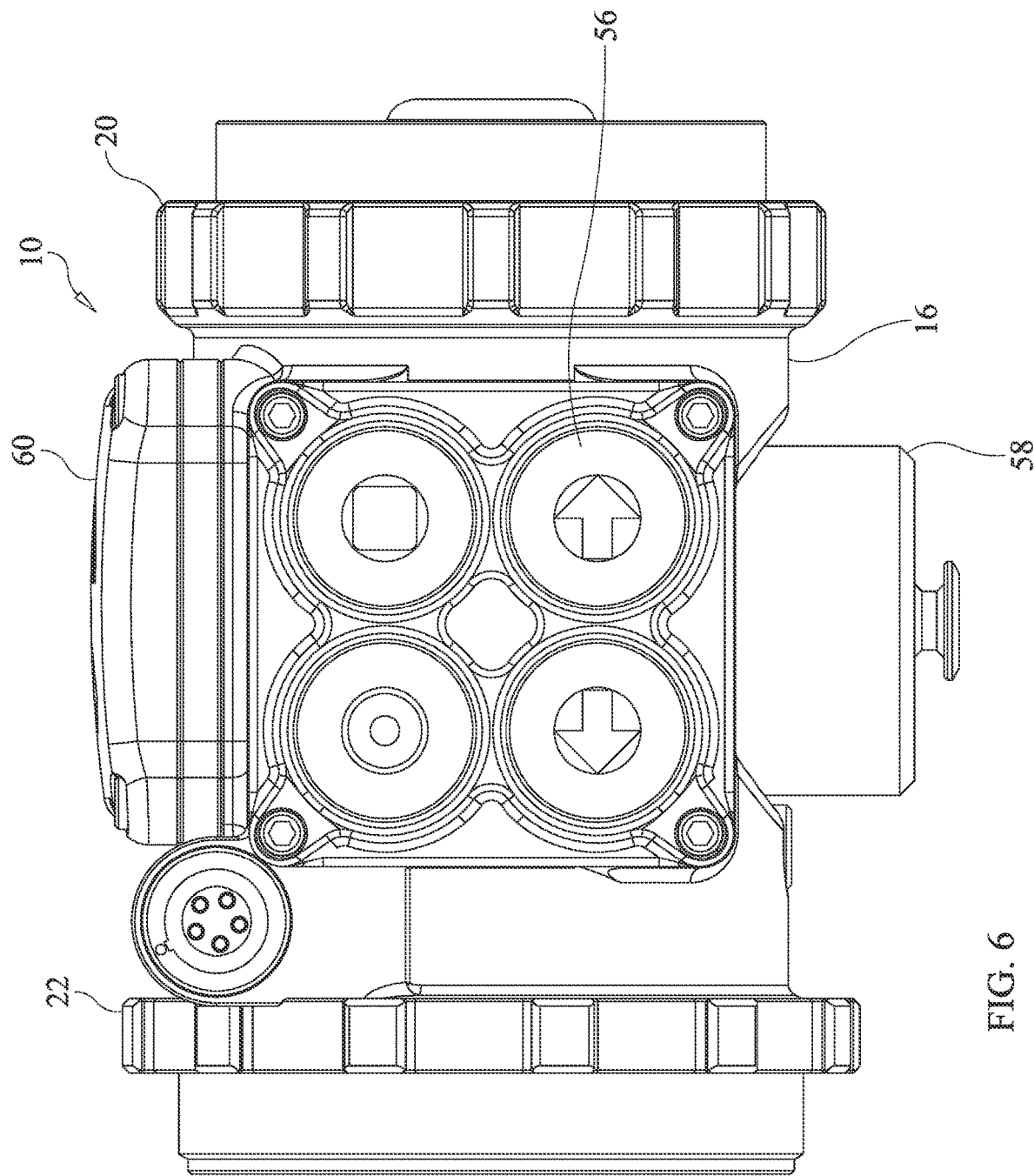
FIG. 6 is a right side view of a multi-task augmented reality heads up display according to an embodiment of the invention.
Figure 7:
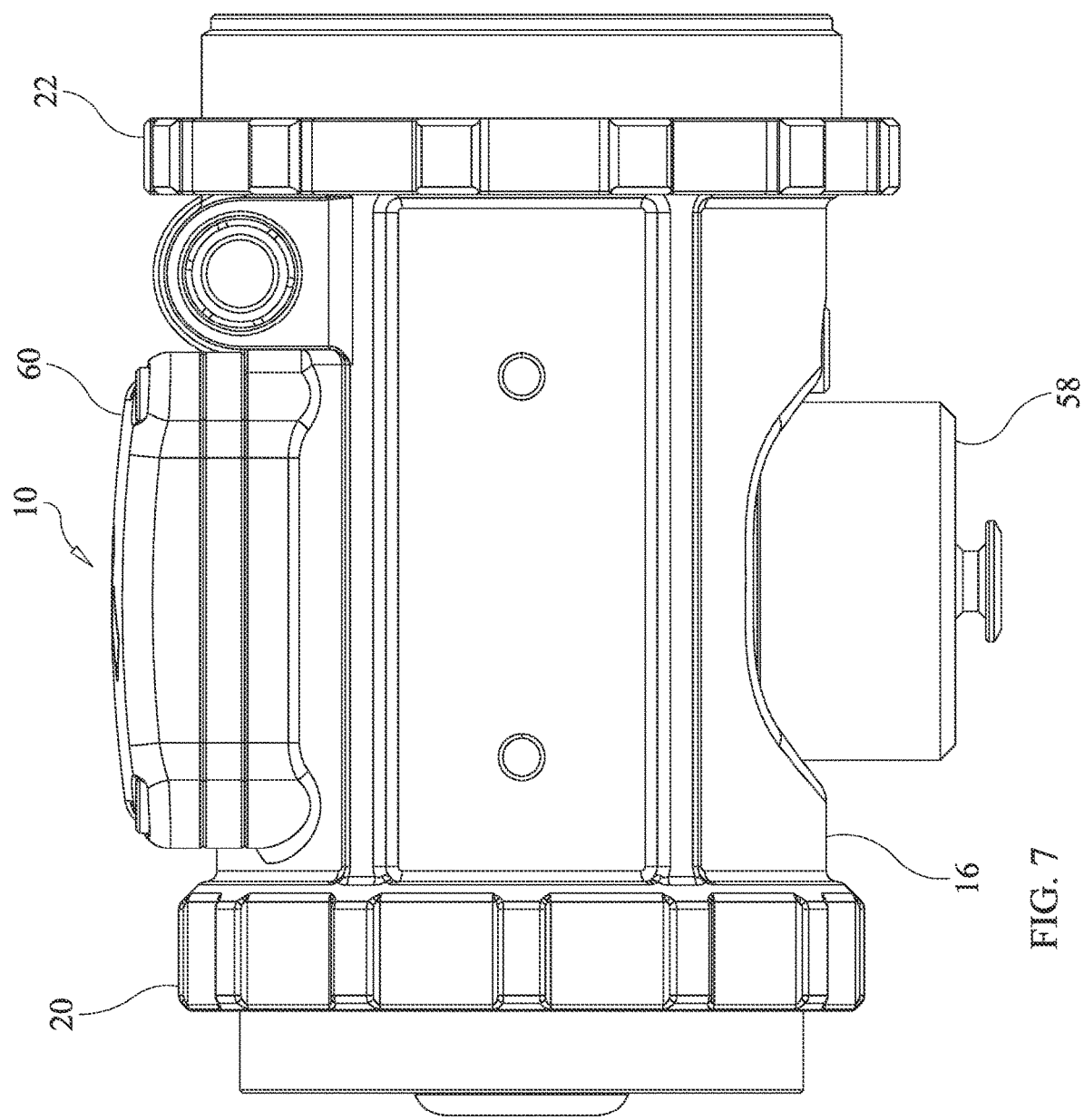
FIG. 7 is a left side view of a multi-task augmented reality heads up display according to an embodiment of the invention.
Figure 9:
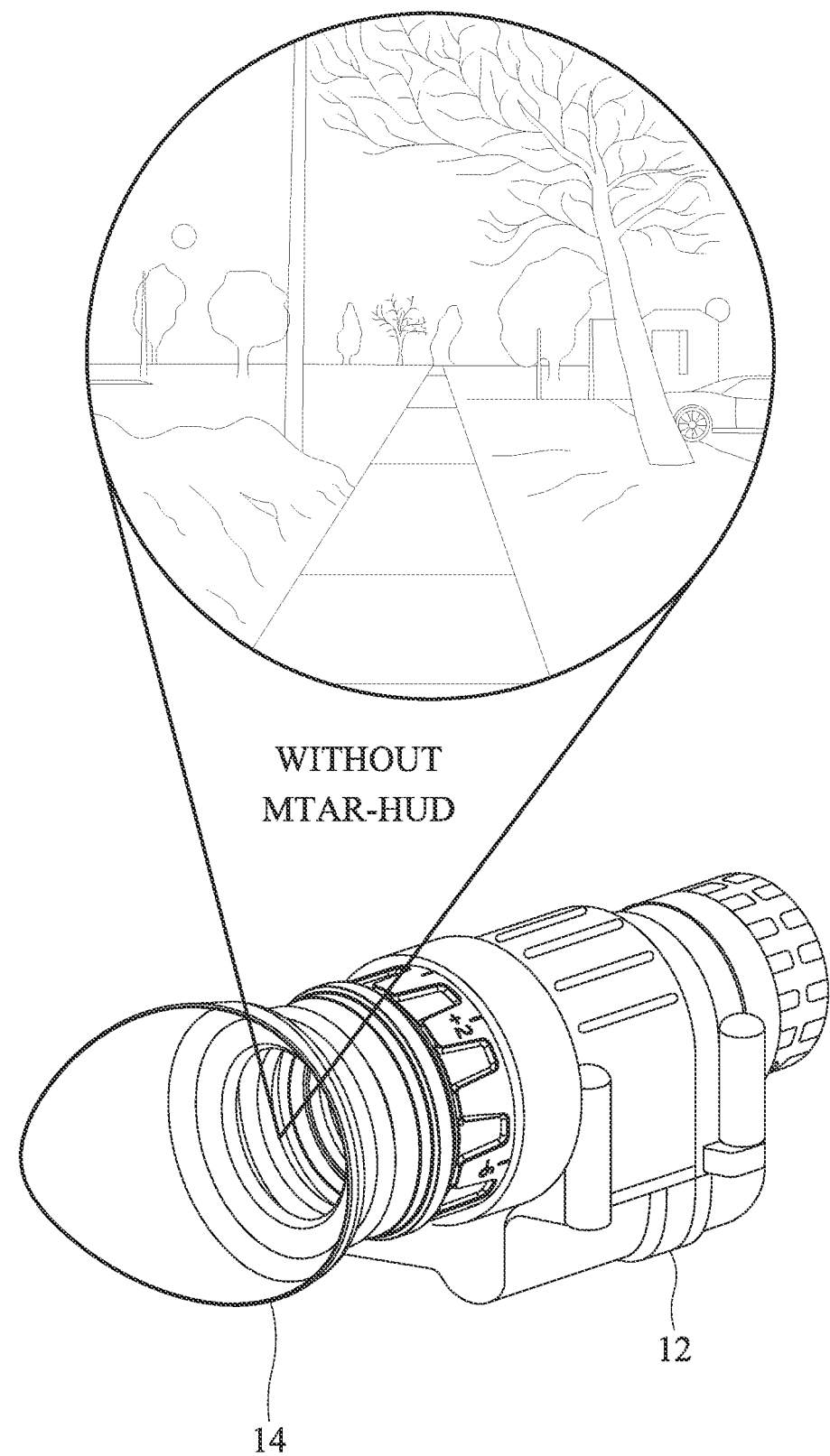
FIG. 9 illustrates a conventional display of a night vision device.
Figure 10:
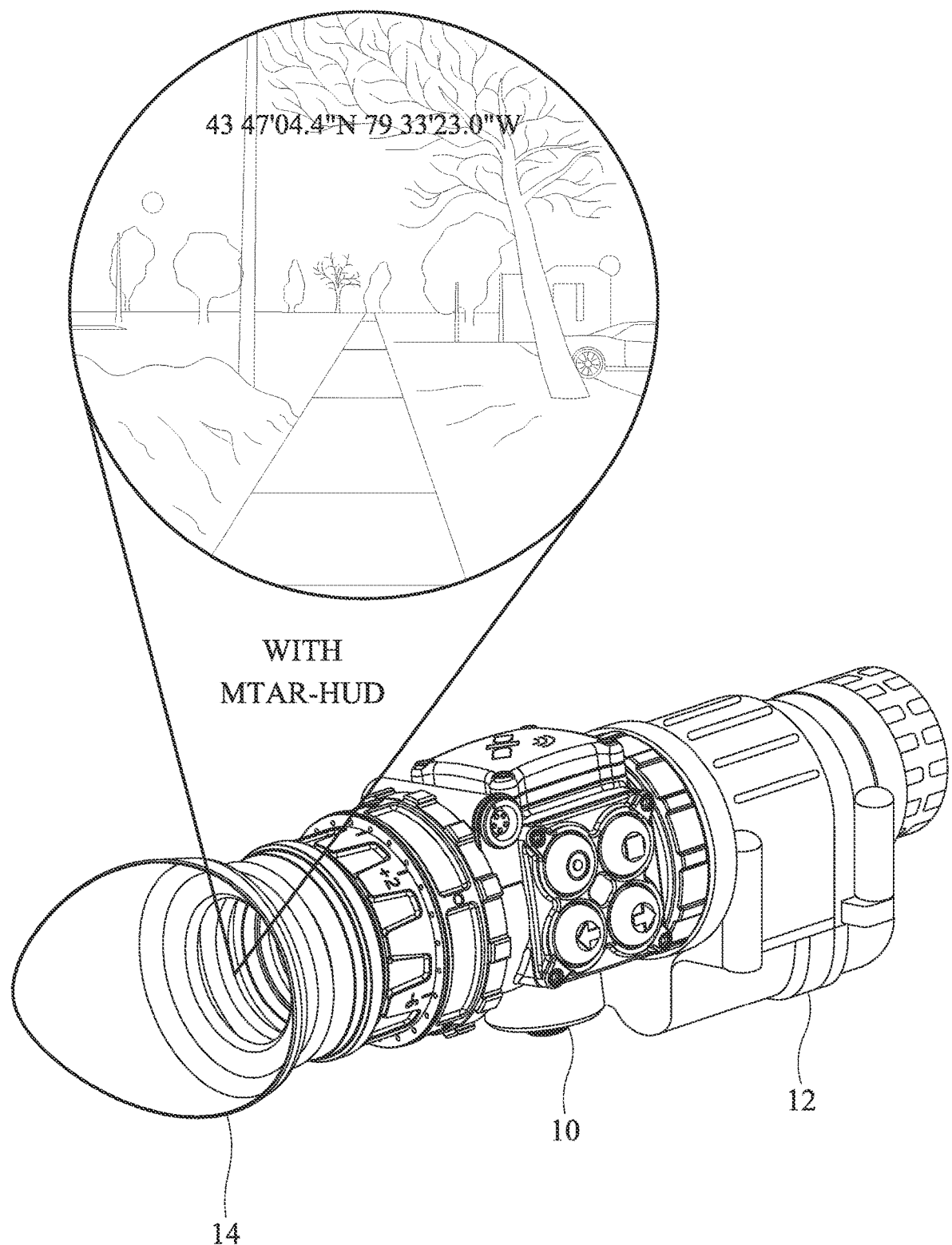
FIG. 10 illustrates a display from the device for multi-task augmented reality heads up display of FIG. 1.

FIG. 9 illustrates a conventional night vision device display and FIG. 10 illustrates the display 18 of the MTAR-HUD 10. In the embodiment illustrated in FIG. 10, information such as GPS coordinates, inclinometer, accelerometer, stadiametric rangefinder, compass, as well as a date stamp or real time clock can be displayed. It is noted that such display information is exemplary only and the MTAR-HUD 10 can display any suitable or desired information. The MTAR-HUD 10 can thus improve a night vision device 12 by displaying an array of vital readings for IMU 42 max situational awareness. Each of these data elements can be displayed or hidden through the device's menu to show an operator or user only information needed a particular situation. Thus, the user can customize the display of information through a user input 56, reducing operator distraction and improving focus on objectives. As seen in FIGS. 2 and 6, the user can operate buttons 56a-56d to scroll through a menu or list of options to specifically enable certain parameters or information to be displayed. In one embodiment, the user input can be in communication with the ECM 44.

Utilizing the disclosed components, embodiments of the invention provide a unique software to process all the signals onto a display 18 for the operator.

Figure 11:
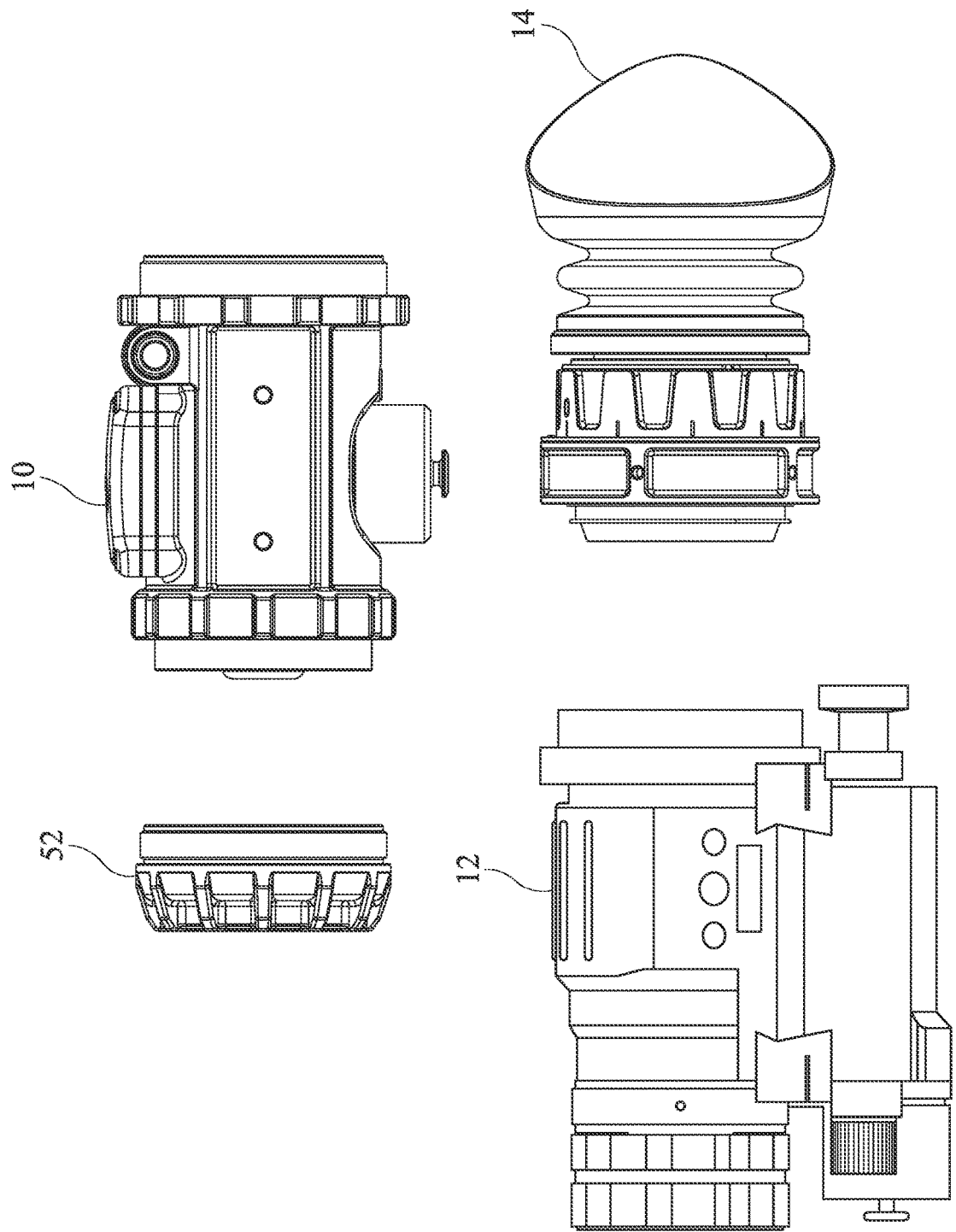
FIG. 11 illustrates the device for multi-task augmented reality heads up display separated from the conventional night vision device.

As illustrated in FIG. 11, the MTAR-HUD 10 does not necessarily need to be used with a night vision device 12, and can be used as a standalone device, camera 24 with recording capability, and other data (GPS, compass etc.) produced on screen. In other words, the MTAR-HUD 10, can be coupled to an eyepiece 14 and used as a camera 24 to view images without the night vision aspect. In such a configuration the device would maintain the recording capability and the overlay capabilities described above.

Thus, the displayed image can be sourced from the night vision device 12 via conversion of parts of MTAR-HUD 10 and a night vision unit, or it can also independently source imagery via a camera 24 that is part of the MTAR-HUD 10 unit.

Figure 12:
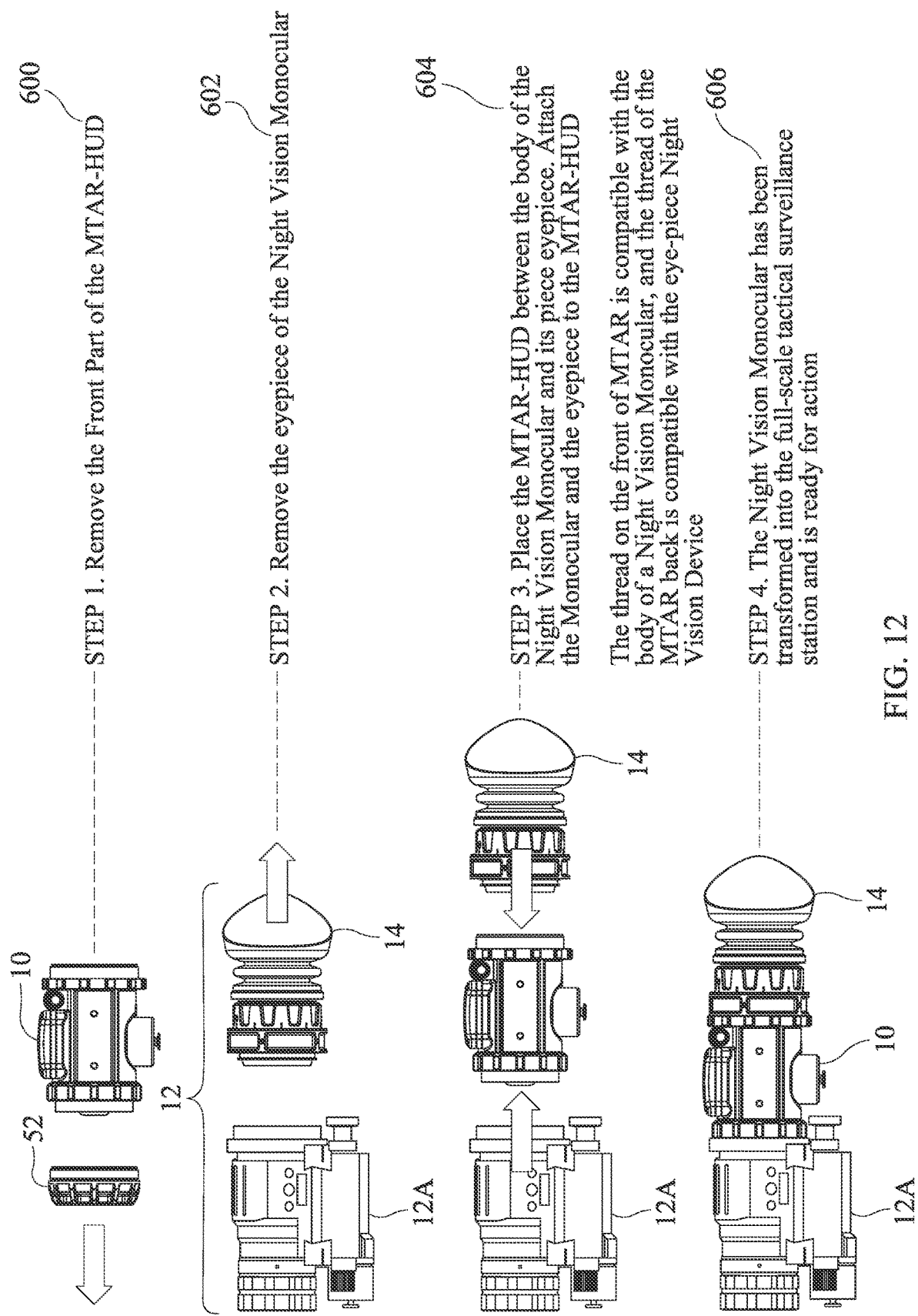
FIG. 12 illustrates attaching the device for multi-task augmented reality heads up display to a night vision device.

FIGS. 11 and 12 illustrate the process of attaching the MTAR-HUD 10 to the night vision device 12, such as a night vision monocular. As can be understood, no special tools or skills are needed to the device to the night vision device 12, and the operation can take less that one minute to complete, even in stressful field conditions.

In the first step 600, the front part 52 of the MTAR-HUD 10 is removed. The front part 52 can be a suitable device or element from protecting the lens 30 of the MTAR-HUD 10. In the next step (second step 602), the eyepiece 14 is removed from the night vision device 12. In the third step 604, the MTAR-HUD 10 is placed between the body (or the image intensifier tube 12A) of the night vision device 12 and the eyepiece 14. The eyepiece 14 and the image intensifier tube 12A of the night vision device 12 are attached to the MTAR-HUD 10. In this embodiment, the thread 22a on the front or send end 22 of the MTAR-HUD 10 is compatible with the thread on the night vision monocular, and the thread 20a on the back or first end 20 of the MTAR-HUD 10 is compatible with the eyepiece 14. In the fourth step 606, it can be seen that the night vision monocular (night vision device 12) can be transformed into a full-scale tactical surveillance station. It is noted that while an embodiment is illustrated being connected to a night vision monocular, the present invention can be used with any type of night vision device 12.

Embodiments of the present invention have advantages over the conventional devices. For example, embodiments described herein 1) can be used as a solitary camera or in conjunction with a night vision device 12; 2) can provide on-screen display 18 information that includes necessary or helpful information; 3) can enhance situational awareness; 4) are useful in handheld applications; 5) are mountable to a helmet enabling handsfree use; 6) can include GPS location; 7) can include magnetic and gyroscopic compass modes; 8) can simultaneously record and stream video; 9) are compact, rugged and lightweight; and 10) fit most existing monocular night vision device 12s.

The night vision device 12 and the eyepiece 14 are conventional components that are well known in the art. Since the night vision device 12 and the eyepiece 14 are well known in the art, these structures will not be discussed or illustrated in detail herein. Rather, it will be apparent to those skilled in the art from this disclosure that the components can be any type of structure and/or programming that can be used to carry out the embodiments of the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a housing configured to attach to a night vision device and an eyepiece that are removably attached to each other, the housing having a first end capable of connecting to the night vision device and a second end capable of connecting to the eyepiece using a same coupling mechanism that enables the night vision device to removably attach directly to the eyepiece;
a camera disposed within the housing and configured to receive an image;
a decoder configured to convert the image from an analogue signal into a digital signal; and
a display to display the converted image, so that the converted image is capable of being viewed.

2. The display device of claim 1, further including
a controller configured to overlay situational information of the display.

3. The display device of claim 1, further including
a recording device configured to record the converted image.

4. The display device of claim 2, further including
a user interface configured to enable the user to select the situational information to be displayed.

5. The display device of claim 1, further including
at least one sensor to determine a parameter related to the orientation or location of the display device.

6. The display device of claim 5, wherein
the at least one sensor includes an inertial measurement unit.

7. The display device of claim 5, further comprising
an electronic controller configured to overlay the parameter on the converted image when the converted image is viewed.

8. The display device of claim 1, further comprising
a storage device configured to store the converted image.

9. A device comprising:
a housing configured to attach to a night vision device and an eyepiece that are removably attached to each other, the housing having a first end capable of connecting to the night vision device and a second end capable of connecting to the eyepiece using a same coupling mechanism that enables the night vision device to removably attach directly to the eyepiece;
a camera disposed within the housing and configured to receive an image;
at least one sensor to determine a parameter related to the orientation or location of the device;
an electronic controller configured to overlay the parameter on the converted image when the converted image is viewed; and
a display to display the converted image with the parameter overlaid on the image, so that the converted image is capable of being viewed with the parameter.

10. The device of claim 9, wherein
the at least one sensor includes an inertial measurement unit.

11. The device of claim 9, further comprising
a storage device configured to store the converted image.

12. The device of claim 9, further including
a recording device configured to record the converted image.

13. A method for displaying an image, comprising:
removing an eyepiece from attachment with a night vision device;
connecting a first end of a housing of a display device to the night vision device;
connecting a second end of the housing to the eyepiece so that the housing is located between the night vision device and the eyepiece;
receiving an image from the night vision device, via a camera disposed within the housing;
converting the image from the night vision device, via a decoder, from an analogue signal into a digital signal; and
displaying the converted image on a display, so that the converted image can be viewed though the eyepiece.

14. The method of claim 13, further including
overlaying situational information of the display.

15. The method of claim 14, further including
selecting via a user interface the situational information to be displayed.

16. The method of claim 13, further including
recording the converted image.

17. The method of claim 13, further including
determining a parameter with at least one sensor related to the orientation or location of the display device.

18. The method of claim 17, wherein
the at least one sensor includes an inertial measurement unit.

19. The method of claim 17, further comprising
overlaying the parameter on the converted image using an electronic controller when the converted image is viewed.

20. The method of claim 13, further comprising
storing the converted image.

* * * * *